United States Patent [19]

Fitzpatrick

[11] 4,317,376

[45] Mar. 2, 1982

[54] FLOWMETER WITH ONE-PIECE BODY

[75] Inventor: H. Paul Fitzpatrick, Newton Square, Pa.

[73] Assignee: Emerson Electric Co., St. Louis, Mo.

[21] Appl. No.: 151,926

[22] Filed: May 21, 1980

[51] Int. Cl.$^3$ ............................................. G01F 1/38
[52] U.S. Cl. ................................. 73/861.55; 403/316
[58] Field of Search ..................... 73/861.55; 70/175; 403/49, 315, 316, 317, 405

[56] References Cited

U.S. PATENT DOCUMENTS

| | | | |
|---|---|---|---|
| 2,707,879 | 5/1955 | Dwyer | 73/861.55 |
| 3,232,107 | 2/1966 | Busillo | 73/861.55 |
| 3,675,481 | 7/1972 | Phillips | 73/861.55 |

Primary Examiner—Jerry W. Myracle
Attorney, Agent, or Firm—Polster, Polster and Lucchesi

[57] ABSTRACT

A flowmeter comprising a one-piece flowmeter body molded of suitable transparent plastic resin. The body has an inlet and outlet port molded therein with a tapered metering tube extending therebetween. A float ball is disposed within the metering tube and is movable therealong in response to changes in the flow rate of fluid flowing through the flowmeter. A valve is sealably installed in the inlet port and an outlet fitting is sealably installed in the outlet port. A retaining plate is received in grooves molded in the back of the flowmeter body with the retaining plate being slidable between an unlocked position in which the fitting and the valve may be installed in or removed from their respective ports in a locked position in which the retainer plate positively and sealably holds the valve and fitting in their respective ports.

10 Claims, 11 Drawing Figures

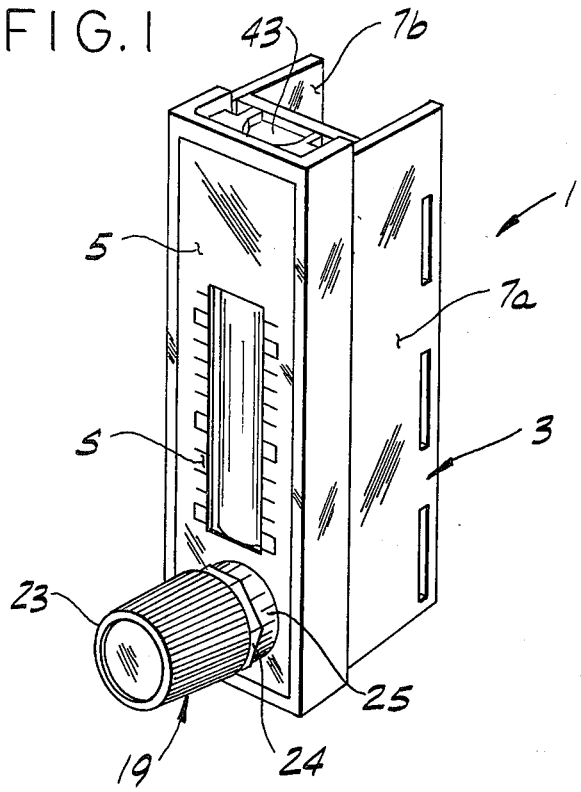
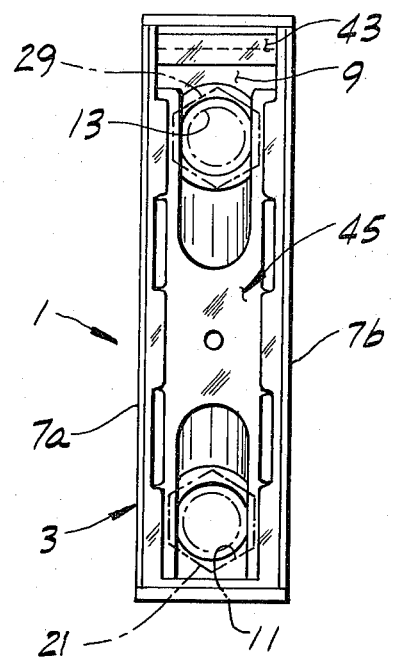
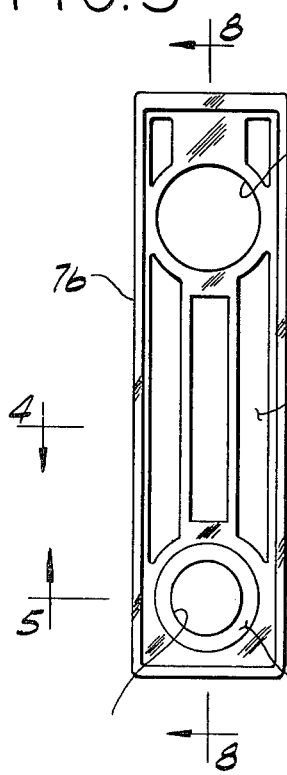
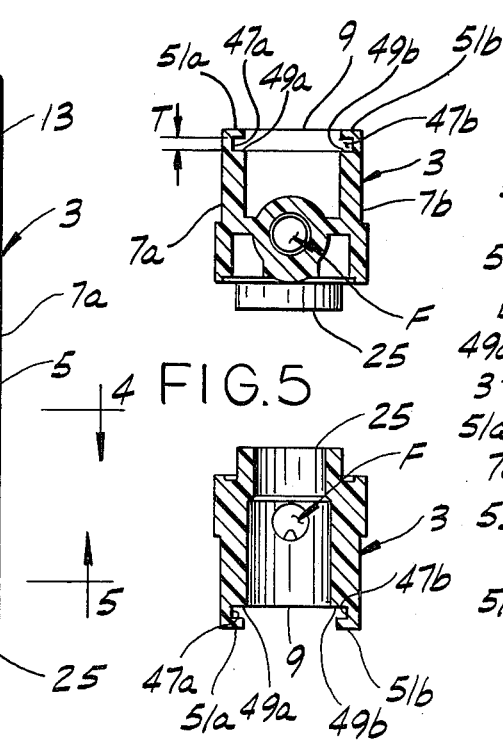
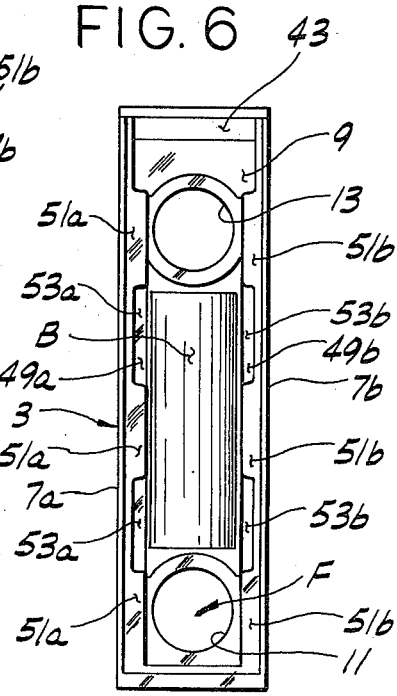

FLOWMETER WITH ONE-PIECE BODY

BACKGROUND OF THE INVENTION

This invention relates to flowmeters, and more particularly to low cost flowmeters of the type utilizing a float disposed within a vertical, tapered, transparent float tube through which the fluid whose flow rate is to be measured flows.

There has been a long standing need for a low cost flowmeter of the type described above, particularly in smaller sizes (i.e., for relatively low flow rates). Such low cost flowmeters are known which have utilized integral flowmeter body assemblies molded of transparent plastic resin. More specifically, these prior flowmeters utilized a one-piece flowmeter body incorporating inlet and outlet ports with a tapered float tube therebetween and having sufficient structure to constitute the sides and front of the meter body. However, a relatively complicated metal (and thus expensive) frame on the back face of the flowmeter body was required for mounting the flowmeter and for securement of a fitting and a control valve in the plastic meter body. Also, it was not considered desirable to thread metal fittings into the plastic flowmeter body.

Reference may be made to such U.S. Pat. Nos. 2,707,879 and 3,675,481 illustrating prior art, low cost flowmeters in the same general field as the instant invention.

Among the several objects and features of the present invention may be noted the provision of such a flowmeter, as described above, in which the flowmeter body is of one-piece construction and in which a control valve and a fitting are readily retained in sealed relation with respect to the body;

The provision of such a flowmeter which may be readily mounted on a control console or the like;

The provision of such a flowmeter in which the control valve and fitting are positively retained in sealing relation relative to the flowmeter body without the requirement of threading them into the flowmeter body;

The provision of such a flowmeter which may be readily assembled and disassembled without the use of even simple hand tools; and The provision of such a flowmeter which is of compact size, which is of light weight and economical construction, and which is accurate in operation.

Other objects and features of this invention will be in part apparent and in part pointed out hereinafter.

SUMMARY OF THE INVENTION

Briefly stated, a flowmeter of the present invention comprises a one-piece body molded of a suitable synthetic resin material, the body having a flow path extending therethrough, the flow path including an inlet port, an outlet port, and a tapered tube extending between the inlet and outlet ports. The diameter of the tapered tube increases from its inlet end to its outlet end. An indicator is moveable within the tapered tube in response to changes in the flowrate therethrough of a fluid whose flow rate is to be measured. The flowmeter further includes a first fitting (valve means) received in one of the ports for controlling the flow of fluid through the flow path. Further, a second fitting is received in the other of the ports. A retainer is provided which is slidable relative to the body between an unlocked position in which the first fitting and the second fitting may be installed in or removed from their respective ports and a locked position in which the first fitting and the second fitting are positively retained relative to the body their respective ports.

BRIEF DESCRIPTION OF THE DRAWINGS

FIG. 1 is a perspective front elevational view of a flowmeter of the present invention, the flowmeter having a one-piece body molded of transparent, synthetic resin material;

FIG. 2 is an elevational view of the back of the flowmeter shown in FIG. 1 illustrating a retainer plate positively holding a control valve and a fitting in inlet and outlet ports provided in the flowmeter body;

FIG. 3 is a front elevational view of the flowmeter body with the control valve and fitting removed from their respective ports;

FIG. 4 is a horizontal cross sectional view taken along line 4—4 of FIG. 3;

FIG. 5 is a horizontal cross sectional view taken along line 5—5 of FIG. 3;

FIG. 6 is a rear elevational view of the flowmeter body;

Corresponding references indicate corresponding parts throughout the several views of the drawings.

DESCRIPTION OF A PREFERRED EMBODIMENT

Figure 10:
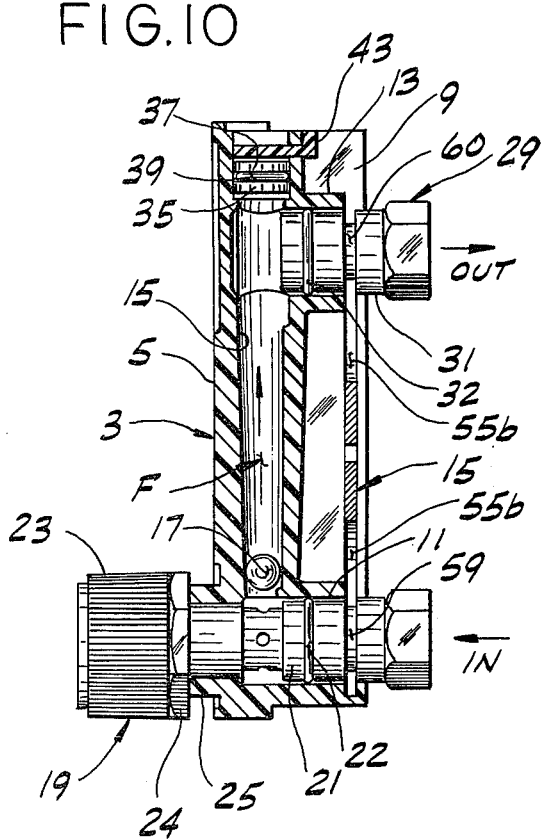
FIG. 10 is a view similar to FIG. 8 showing a control valve and a fitting installed in their respective ports in the flowmeter body.

Referring now to the drawings, and particularly to FIG. 1, a flowmeter of the present invention is indicated in its entirety by reference character 1. The flowmeter is shown to comprise a one-piece body 3 preferably molded with a suitable transparent synthetic resin material, such as a transparent polycarbonate resin. Flowmeter body 3 includes a front 5, sides 7a and 7b, and a back 9. A flow path, as generally indicated at F, is provided within body 3. More specifically, the flow path includes an inlet port or bore 11 at the bottom of the flowmeter body (as viewed in FIGS. 2, 3, 6, 8 and 10) and an outlet port or bore 13 at the top of the flowmeter body. A tapered metering tube 15 (see FIGS. 8 and 10) is provided within body 3 extends vertically from inlet port 11 to outlet port 13 and is in communication with both the inlet and outlet ports. As is conventional for this type of flowmeter, the cross section (or diameter) of the tapered metering tube increases from its inlet end to its outlet end. An indicator ball or float, as indicated at 17 in FIG. 10, is disposed within the metering tube and is movable along the length of the metering tube upon the flow of fluid thereto so as to assume an equilibrium position corresponding to the flowrate of the fluid flowing through flow path F. A scale S (FIG. 1) is provided on the front face 5 of the metering body so that the position of the indicator ball may be determined relative to the scale whereby the flowrate of the fluid flowing through the flowmeter may be determined. Further, an opaque backing, as indicated at B (See FIG. 6), such as opaque plastic adhesive tape or the like, is applied to a portion of flowmeter body 3 defining the exterior of the flowmeter body in which tapered bore 15 is formed. This opaque backing serves as a screen against which indicator 17 is more clearly visible relative to scale means S so as to facilitate reading of the flow rate of the flowmeter.

As indicated generally at 19, a control valve is provided in the flow body for controlling the flowrate of the fluid flowing through flow path F. In FIG. 10, valve means 19 is shown to be a metering valve having a metallic valve body 21 (also referred to as a first fitting) carrying suitable O-ring seals 22 for sealing the valve body with respect to a portion of meter body 3 defining inlet port 11. Valve means 19 further comprises a knob assembly 23 threadably inserted into valve body 21 from the front face of body 3. More specifically, knob assembly 23 includes a retainer nut 24 engageable with a shoulder 25 surrounding a portion of inlet port 11, the shoulder projecting outwardly beyond the front 5 of body 3. Thus, with the knob assembly threadably installed in valve body 21, the valve assembly is held captive, at least in part, by retaining nut 24 cooperating with shoulder 25.

As shown in FIG. 10, a fluid coupling or second fitting, as generally indicated at 29, is provided in outlet bore 13 so as to enable the outlet of flow path F to be connected in a suitable flow system or the like (not shown). More specifically, fitting 29 includes a fitting body 31 made of metal or the like and having a circumferential groove on the exterior of the body, the groove receiving an O-ring 32 for sealably engaging the walls of body 3 defining outlet port 13 thereby to seal the fitting with respect to the outlet port.

Figure 7:
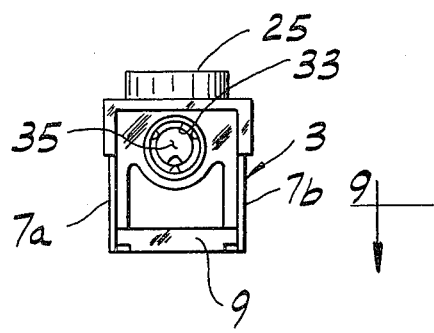
FIG. 7 is a top plan view of the flowmeter body.
Figure 8:
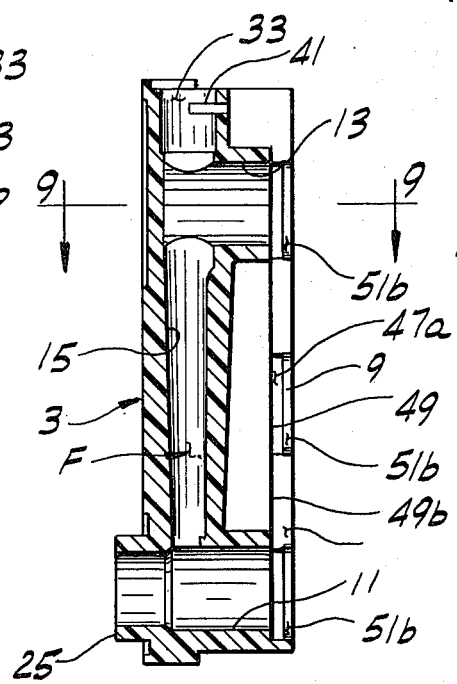
FIG. 8 is a longitudinal cross sectional of the flowmeter body view taken along line 8—8 of FIG. 3.

As indicated at 33 in FIGS. 7 and 8, an opening is provided in the upper end of flowmeter body 3 in communication with outlet port 13. This opening is shown to be coaxial with metering tube 15 and is of somewhat larger diameter than the largest end of the metering tube. It will be understood that opening 33 is provided in the metering body for enabling the tapered metering tube to be molded within body 3 and serves as an access port for a suitable core in flowmeter body mold. Of course, it is necessary for operation of the flowmeter that opening 33 be sealably closed. To accomplish this, a plug 35 is inserted in opening 33, this plug having a circumferential groove 37 therearound receiving an O-ring 39 which sealably engages the walls of body 3 defining opening 33. A gate slot 41 (FIG. 8) is provided in the back face of a portion of the body defining opening 33 and a gate 43 (FIG. 10) is slidably received in gate slot 41 for preventing outward movement of plug 35 from its position shown in FIG. 10.

Figure 9:
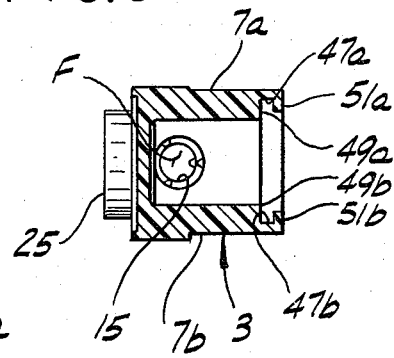
FIG. 9 is a horizontal cross sectional view taken along line 9—9 of FIG. 8.

In accordance with this invention, a retaining plate, indicated generally at 45, is received in the back face 9 of body 3 for positively retaining valve means 19 and fitting 29 in sealing relationship with their respective inlet and outlet ports 11 and 13. More specifically, flowmeter body 13 has grooves 47a, 47b (see FIGS. 2, 5 and 9) provided therein at the back of the body on opposite sides thereof. Grooves 47a, 47b are spaced apart from one another and face inwardly toward one another. Specifically, these grooves are each defined by a respective outwardly facing shoulder 49a, 49b molded-in-place in sides 7a and 7b of the flowmeter body with a plurality of respective flanges 51a, 51b, extending out over shoulders 49a, 49b and being spaced from the shoulders a distance, as indicated by dimension T in FIG. 4. As best shown in FIG. 6, flanges 51a, 51b are spaced longitudinally apart from one another so as to define respective openings 53a, 53b between the adjacent longitudinal flanges 51a and 51b for purposes as will appear.

Figure 11:
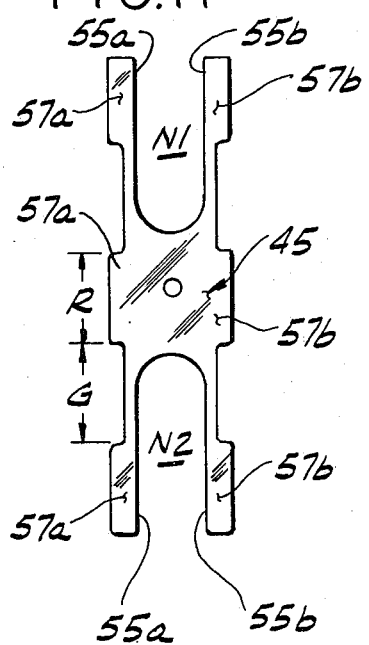
FIG. 11 is a plan view of a retaining plate for positively holding the above-noted control valve and fitting in sealable relation within their respective ports the flowmeter body.

Referring now to FIG. 11, retaining plate 45 is shown to comprise two pairs of spaced fingers 55a, 55b at each end of the retaining plate defining a blind notch N1, N2 at each end of the retaining plate. The retaining plate further includes a plurality of spaced tabs 57a, 57b along each longitudinal marginal edges thereof with each of the tabs having a length R which is somewhat less than the length of openings 53a, 53b between adjacent flanges 51a, 51b on flowmeter body 3. The space between adjacent flanges 57 on retaining plate 45 is indicated by dimension G in FIG. 11 and these spaces are somewhat greater than the length of flanges 51a, 51b on the flowmeter body. Preferably, retaining plate 45 is stamped of sheet metal or the like.

Further, valve body 21 and fitting body 31 are each provided with respective circumferential grooves 59 and 60 (see FIG. 10) in their outer surface generally in register with grooves 47a, 47b in flowmeter body 3 when the valve body and fitting body are sealably inserted in a desired installed position in their respective inlet and outlet ports 11 and 13. It will be understood that the width of groove 59 in valve body 21 and groove 60 in fitting body 31 are generally only somewhat greater than the thickness of retaining plate 53, and that the diameter of the valve body and fitting body at the base of grooves 59 and 60 is somewhat less than the width of their respective blind notches N1 and N2 in the retaining plate.

To assembly flowmeter 1 of the present invention, ball 17 is inserted in tapered metering tube 15 of one-piece flowmeter body 3. Then, plug 35 is sealably inserted in opening 33 and gate 43 is inserted in gate slot 41 so as to hold the plug in place within opening 33. Retaining plate 53 is then applied to fitting body so that fingers 55a, 55b of the retaining plate defining notch N1 are received in groove 60 of the fitting body. Fitting body 31 is then inserted in outlet port 13 from the backside of flowmeter body 3, and retaining plate 45 is disposed longitudinally of the flowmeter body 3 on the backside thereof such that gaps G between tabs 57a, 57b of the retaining plate are in register with flanges 51a, 51b. Thus, retaining plate 45 may be moved inwardly so that the bottom face of the retaining plate tabs 57a, 57b bears on respective shoulders 49a, 49b and so that the retaining plate is then received within grooves 47a, 47b. With the retaining plate so installed, the retaining plate may be slid axially within grooves 47a, 47b toward fitting body 31 to an unlocked position such that the ends of the retaining plate are clear of inlet port 11. In this manner, valve body 21 may be inserted in inlet port 11. With the valve body in place in the inlet port, the retaining plate may then be slid axially within grooves 47a, 47b from its unlocked position, as described above, to a locking position in which fingers 55a, 55b defining notch N2 are received within the circumferential groove 59 in valve body 21 thereby to positively hold the valve body in inlet port 11 and also to positively hold fitting body 31 outlet port 13. In the locked position, retaining plate tabs 57a, 57b are held captive between their respective shoulders 49a, 49b and flanges 51a, 51b. Also, the thickness T of grooves 47a, 47b and the thickness of retaining plate 45 is such that the retaining plate preferably has a tight, slidable fit in the grooves to resist being inadvertently slid from its locking position.

In accordance with the objects of this invention, it will be noted control valve 19 and fitting 29 may be installed within their respective inlet and outlet ports 11 and 13 and may be positively retained in sealing engagement with the valve body by means of retaining plate 45 without the use of even simple hand tools. Further, it will be noted that with retaining plate 45 positively holding the fitting and control valve in place within the inlet and outlet ports, the retaining plate only holds the valve and fitting against axial removal from their respective ports and the O-ring seals 22 and 32 between valve body 21 and fitting 31 and their respective inlet and outlet bores 11 and 13 in flowmeter body 3 permit a limited amount of movement of the valve body and fitting relative to flowmeter body 3 without leakage. In this manner, any differential thermal expansion between sheet metal retaining plate 45, metal valve body 21 or metal fitting body 31, and plastic resin flowmeter body 3 is not critical.

As shown in the drawings, valve body 21 is sealably installed in inlet port 11 and fitting 29 is sealably installed in outlet port 31. However, within the broader aspects of this invention, it will be understood that flowmeter body 3 may be readily modified so that the outlet port receives the control valve and so that the inlet port receives the fitting. Further, it will be understood that the control valve may be located remotely from the flowmeter and, in place of the valve body, a fitting similar to fitting 29 may be placed in a respective inlet or outlet port. Regardless of which of the above-described embodiments is employed, retainer plate 45 operates in the manner described above.

In view of the above, it will be seen that the several objects and features of this invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A flowmeter comprising a one-piece body of a suitable synthetic resin material, said flowmeter body having a flow path extending therethrough, said flow path including an inlet port, an outlet port, and a tapered flow passage between said inlet and outlet ports, the diameter of said tapered flow path increasing from the inlet to the outlet port thereof, an indicator movable within said tapered flow path in response to changes in the flowrate therethrough of a fluid whose flow rate is to be measured, a first fitting received in one of said ports, a second fitting received in the other of said ports, groove means in said flowmeter body, and a retainer received in said groove means slidable relative to said body between an unlocked position in which said valve means and said fittings may be installed in or removed from said inlet and outlet ports and a locked position in which said fittings are positively retained with respect to said flowmeter body in said inlet and said outlet ports.

2. A flowmeter as set forth in claim 1 further including seal means carried by said first and second fittings for sealably engaging portions of said flowmeter body defining said inlet and outlet ports.

3. A flowmeter as set forth in claim 1 wherein said retainer has at least one tab at each side thereof slidably received in said groove means and an elongate notch at each end thereof, said first and second fittings each having a circumferential groove on the exterior thereof, the portions of said retainer defining said notches being received in said first fitting and second fitting circumferential grooves thereby to positively retain said first and second fittings in said inlet and outlet ports.

4. A flowmeter as set forth in claim 3 wherein with said portions of said retainer defining said notch being received in said circumferential groove of said fittings, said retainer and said fitting are installable within said body together, said one notch being of sufficient length so as to permit said retainer to be slid in said grooves from its unlocked to its locked position.

5. A flowmeter as set forth in claim 1 wherein said said first fitting is a valve having a valve body sealably received in its respective port, and wherein a knob assembly is securable to said valve body from the front of said body after installation of said valve body in its respective port, said knob assembly being cooperable with said body for preventing withdrawal of said valve body from its respective port.

6. A flowmeter as set forth in claim 1 wherein said flowmeter body is molded of a transparent, synthetic resin material, and wherein said flowmeter further comprises scale means applied to the front of said flowmeter body whereby the position of said indicator and said tapered tube may be compared to said scale means so as to permit the flowrate of the fluid flowing through the flowmeter to be read.

7. A flowmeter as set forth in claim 6 further including opaque means applied to the outside of said tapered tube on the backside thereof to aid in making said indicator more visible within said tapered tube.

8. A flowmeter as set forth in claim 1 wherein said flowmeter body further has a opening therein coaxial with and in communication with the enlarged end of said tapered tube, a plug sealably fitted within said opening for sealably closing the latter, and means for retaining said plug in sealed relation within said opening.

9. A flowmeter comprising a one-piece body of a suitable synthetic resin material, said body having a flow path extending therethrough, said flow path including an inlet port, an outlet port, and a tapered flow passage between said inlet and outlet ports, said inlet and outlet ports each having an axis generally perpendicular to the longitudinal axis of said tapered flow path, the diameter of said tapered flow path increasing from the inlet to the outlet end thereof, an indicator movable within said tapered flow path in response to changes in the flowrate therethrough of a fluid whose flow rate is to be measured, valve means received in one of said ports for controlling the flow of fluid through said flowpath, said valve means having a portion thereof extending out beyond the back of said body, a fitting received in the other of said ports, said fitting having a portion thereof extending out beyond the back of said body, groove means in the back of said body, and a retainer on the back of said body slidable relative to said body in a direction generally perpendicular to said inlet and outlet ports between an unlocked position in which said valve means and said fitting may be installed in or removed from said inlet and outlet ports and a locked position in which said valve means and said fitting are positively retained with respect to said body in said inlet and said outlet ports.

10. A flowmeter having a one-piece body molded of a suitable, transparent, synthetic resin material, said flowmeter body having a front, a back, and sides, said flowmeter body having an inlet bore and an outlet bore, said inlet and outlet bores being generally parallel and open from the backside of the flowmeter body, a tapered bore extending between and being in communication with said inlet and outlet bores with the smaller cross section of the tapered bore being adjacent said inlet bore, valve means including a valve body sealably received within said inlet bore, a fitting sealably received within said outlet bore, said flowmeter body having retaining grooves in the back thereof extending generally perpendicular to the axes of said inlet and outlet bores, said valve body and said fitting each having a circumferential groove on the exterior thereof in register with said retaining grooves when said valve body and said fitting are sealably received in their respective inlet and outlet bores, a retainer plate having a pair of spaced fingers at each end thereof defining notches there between for the reception of said valve body and said fitting with the inner edges of said fingers being received at least in part in said circumferential grooves in said valve body and said fitting, the outer side marginal edges of said retaining plate being slidably received in said grooves for sliding movement of the retainer plate relative to said body between an unlocked position in which one of the valve body or the fitting may be inserted in or removed from its respective inlet or outlet bore and in which the retaining plate may be received in or removed from said retaining grooves and a locked position in which said fingers are received in the circumferential grooves of both said valve body and said fitting and in which the side marginal edges of said retaining plate are held captive within said retaining grooves thereby to retain the valve body and said fitting in their respective inlet and outlet bores.

* * * * *